( 12 ) United States Patent
Wang

(10) Patent No.: US 7,488,045 B1
(45) Date of Patent: Feb. 10, 2009

(54) FASTENING STRUCTURE OF A WHEEL COVER

(75) Inventor: Hung-Sheng Wang, Tainan (TW)

(73) Assignee: Guu Yih Plastics Co., Ltd., Tainan County (TW)

( * ) Notice: Subject to any disclaimer, the term of this patent is extended or adjusted under 35 U.S.C. 154(b) by 0 days.

(21) Appl. No.: 11/987,148

(22) Filed: Nov. 28, 2007

(51) Int. Cl.
*B60B 7/12* (2006.01)

(52) U.S. Cl. ............. 301/37.33; 301/37.34; 301/37.101

(58) Field of Classification Search ............ 301/37.101, 301/37.102, 37.32, 37.33, 37.34, 37.106, 301/37.42; 428/43, 99
See application file for complete search history.

(56) References Cited

U.S. PATENT DOCUMENTS

| 4,596,425 | A | * | 6/1986 | Hung | 301/37.34 |
| 5,108,157 | A | * | 4/1992 | Chen | 301/37.42 |
| 5,601,899 | A | * | 2/1997 | Campbell | 428/99 |
| 5,718,484 | A | * | 2/1998 | Sheu | 301/37.33 |
| 5,752,745 | A | * | 5/1998 | Sheu | 301/37.32 |
| 6,682,150 | B1 | * | 1/2004 | Chen | 301/37.33 |
| 6,789,854 | B2 | * | 9/2004 | Wang | 301/37.33 |
| 7,213,889 | B2 | * | 5/2007 | Wang | 301/37.33 |
| 2004/0145236 | A1 | * | 7/2004 | Wang | 301/37.101 |
| 2004/0195906 | A1 | * | 10/2004 | Huang | 301/37.33 |

* cited by examiner

*Primary Examiner*—Russell D Stormer
*Assistant Examiner*—Kip T Kotter
(74) *Attorney, Agent, or Firm*—Rosenberg, Klein & Lee

(57) ABSTRACT

A wheel cover includes a raised main body, and several composite fastening components to be joined to an iron ring of a wheel; the wheel cover main body has an annular portion on an inner side, and several hollow portions; each fastening component includes a holding base member, and a fastening piece; the holding base members are formed on the annular portion of the inner side of the raised body; the fastening piece are each formed on one of inner sides of peripheries of the hollow portions; each of the fastening pieces is joined to the raised main body at a connecting portion; in assembly, the fastening pieces are removed from the raised main body, and joined to the holding base members to constitute the fastening components; therefore, when several not-assembled wheel covers are stacked up, the fastening pieces won't cause increase to the volume of the pile.

6 Claims, 9 Drawing Sheets

FASTENING STRUCTURE OF A WHEEL COVER

BACKGROUND OF THE INVENTION

1. Field of the Invention

The present invention relates to an improvement on a fastening structure of a wheel cover, more particularly one, which includes several composite fastening components each consisting of a holding base member, and a fastening piece formed together with the wheel cover body; when several such wheel covers are stacked up, the fastening pieces won't cause increase to the volume of the pile.

2. Brief Description of the Prior Art

Wheels of cars can be made of iron or aluminum alloy. An aluminum alloy wheel doesn't have to be covered with a wheel cover because aluminum alloy wheels have already been made with a pleasant and ornamental look. An iron wheel has to be covered with a wheel cover because the iron wheel isn't very pleasant-looking, and doesn't match the car.

A conventional wheel cover has several fastening parts on an inner side of a main body thereof. The fastening parts each have a convex portion, and the wheel cover is fixed to an iron wheel with the fastening parts being joined to a ringed portion of the iron wheel. Such wheel covers have a drawback: when several wheel covers are stacked up, the fastening parts will cause increase to the volume of the pile. In other words, owing to the fastening parts, when the wheel covers are stacked up, they won't be closely together. Consequently, the pile of wheel covers takes relatively much space, causing increase to the storage and transportation cost.

To overcome the above problem, the inventor of the present invention taught "an improvement on a securing element of a wheel cover", which was disclosed in U.S. Pat. No. 6,789,854. Referring to FIG. 9, the wheel cover 4 has several connecting projections 41 equidistantly spaced near an edge of an inward side thereof, and securing elements 3 to be fixed to respective ones of the connecting projections 41. Each of the connecting projections 41 has a gap 42 on a middle of an upper end thereof, an engaging hole 44 in the middle, and a bar-shaped portion 43 between the gap 42 and the engaging hole 44. Each securing element 3 has a connecting plate 35, which projects down from a lower end, and which has an engaging block 36 projecting from an inward side and an engaging space 37 formed right above the engaging block 36. The securing elements 3 are joined to respective connecting projections 41 so that the former can be pivoted on the latter between an upright in-use position where the engaging blocks 36 are fitted into the engaging holes 44 and a not-in-use laid down position where the engaging blocks 36 are disengaged from the engaging holes 44 and where the engaging spaces 37 receive the bar-shaped portions 43 therein.

To fix the wheel cover to an iron wheel, first the securing elements 3 are moved to the upright in-use position, and next an iron ring is fitted in the holding trenches 34 of the securing elements 3, and finally the wheel cover is fixed to the iron wheel by means of the convexly curved portions 31 of the securing elements 3. And, when several such wheel covers are stacked up with the securing elements 3 in the laid-down position, the securing elements 3 won't cause increase to the pile, and in turn the wheel covers will be closely together.

The above wheel cover is found to have the following drawbacks: The manufacture has to prepare an additional mold to manufacture the securing elements, and therefore the manufacturing cost is relatively high. And, there is risk of the securing elements being omitted in packaging in the factory/missing in shipment because they come in separate parts before the wheel cover is assembled. Therefore, there is room for improvement.

SUMMARY OF THE INVENTION

It is a main object of the present invention to provide an improvement on a fastening structure of a wheel cover to overcome the above problems.

A wheel cover according to an embodiment of the present invention includes a main body, and several composite fastening components on an inner side of the main body to couple the wheel cover to a wheel; the main body has several hollow portions; each fastening component includes a holding base member, and a fastening piece; the holding base members are formed on an annular portion of an inner side of the main body; the fastening piece are each formed on one of inner sides of peripheries of the hollow portions of the main body; in assembly, the fastening pieces are removed from the main body, and joined to the holding base members. Therefore, when several not-assembled wheel covers are stacked up, the fastening pieces won't cause increase to the volume of the pile, and the pile of wheel covers will be closely together.

BRIEF DESCRIPTION OF THE DRAWINGS

The present invention will be better understood by referring to the accompanying drawings, wherein.

DETAILED DESCRIPTION OF THE PREFERRED EMBODIMENTS

Figure 1:
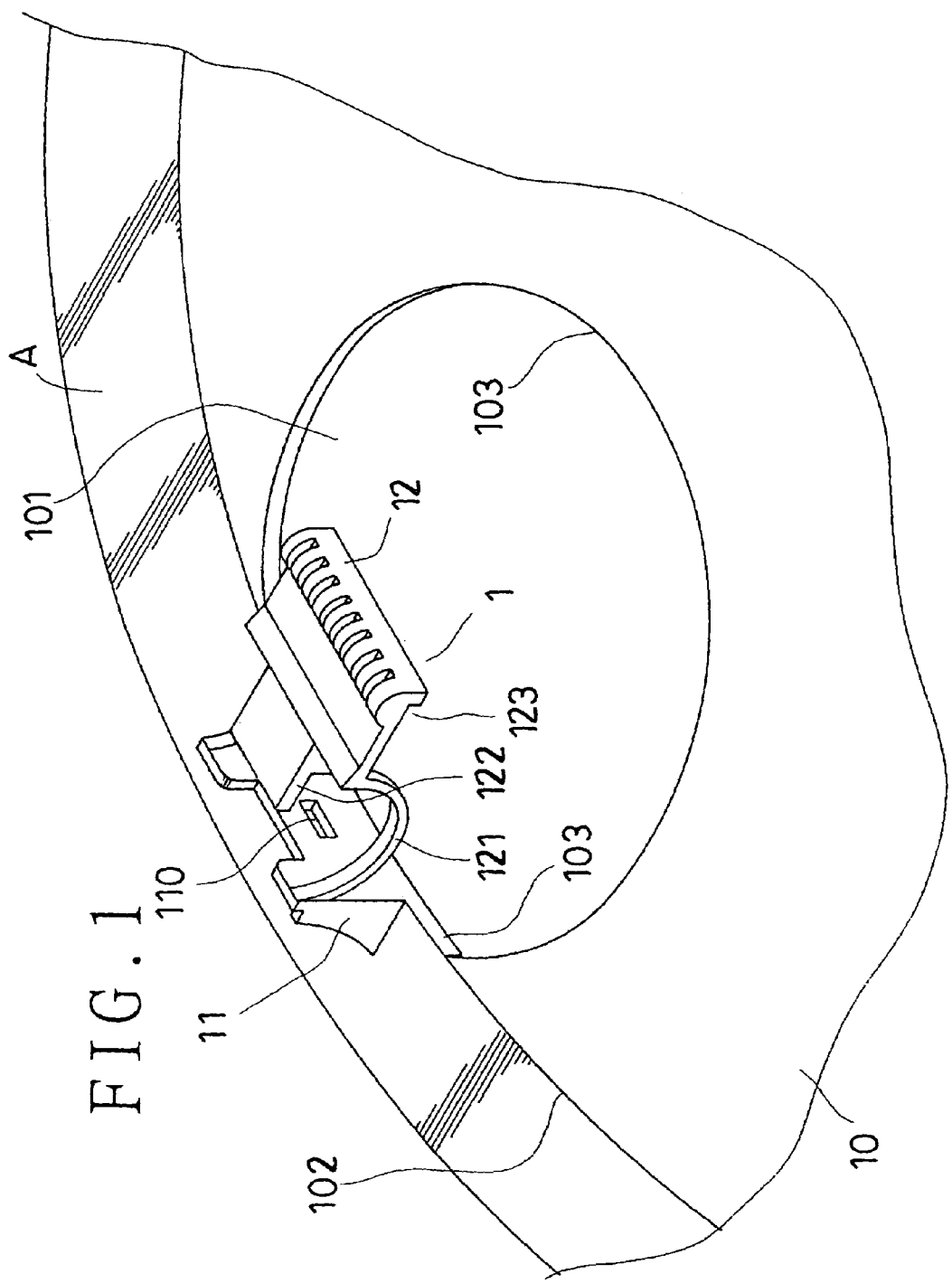
FIG. 1 is a partial perspective view of the present invention.

Referring to FIG. 1, a preferred embodiment of a fastening structure of a wheel cover (A) of the present invention includes several composite fastening components 1. The wheel cover (A) has a raised ornamental body 10, which is formed with an annular portion 102 on an inner side, and several hollow portions 101.

Each of the composite fastening components 1 consists of a holding base member 11, and a fastening piece 12 to settle on the holding base member 11.

The holding base members 11 of the composite fastening components 1 are formed on the annular portion 102 of the raised ornamental body 10 of the wheel cover (A) in an equidistant manner; each of the holding base members 11 has a detainment portion 110.

The fastening pieces 12 are each formed on a respective one of peripheries 103 of the hollow portions 101 of the wheel cover (A). Each of the fastening pieces 12 has a connecting portion 121 joined to a corresponding said periphery 103, and a fitting portion 122, which is to be connected to the detainment portion 110 of a corresponding said holding base member 11 so as to join the fastening piece 12 and the holding base member 11 together. Each of the fastening pieces 12 further has a recessed holding portion 123. Furthermore, the holding base members 11 and the fastening pieces 12 are formed together with the main body of the wheel cover (A) in manufacturing. In other words, the wheel cover (A) is formed to have single part by means of single mold. Consequently, the manufacturer only has to prepare single mold to manufacture the wheel cover (A), and the manufacturing cost is relatively low.

Furthermore, because the fastening pieces 12 are originally connected with the raised ornamental body 10 at the connecting portions 121 thereof, there will be no risk of the fastening pieces 12 being omitted in packing/getting lost in shipment.

Figure 3:
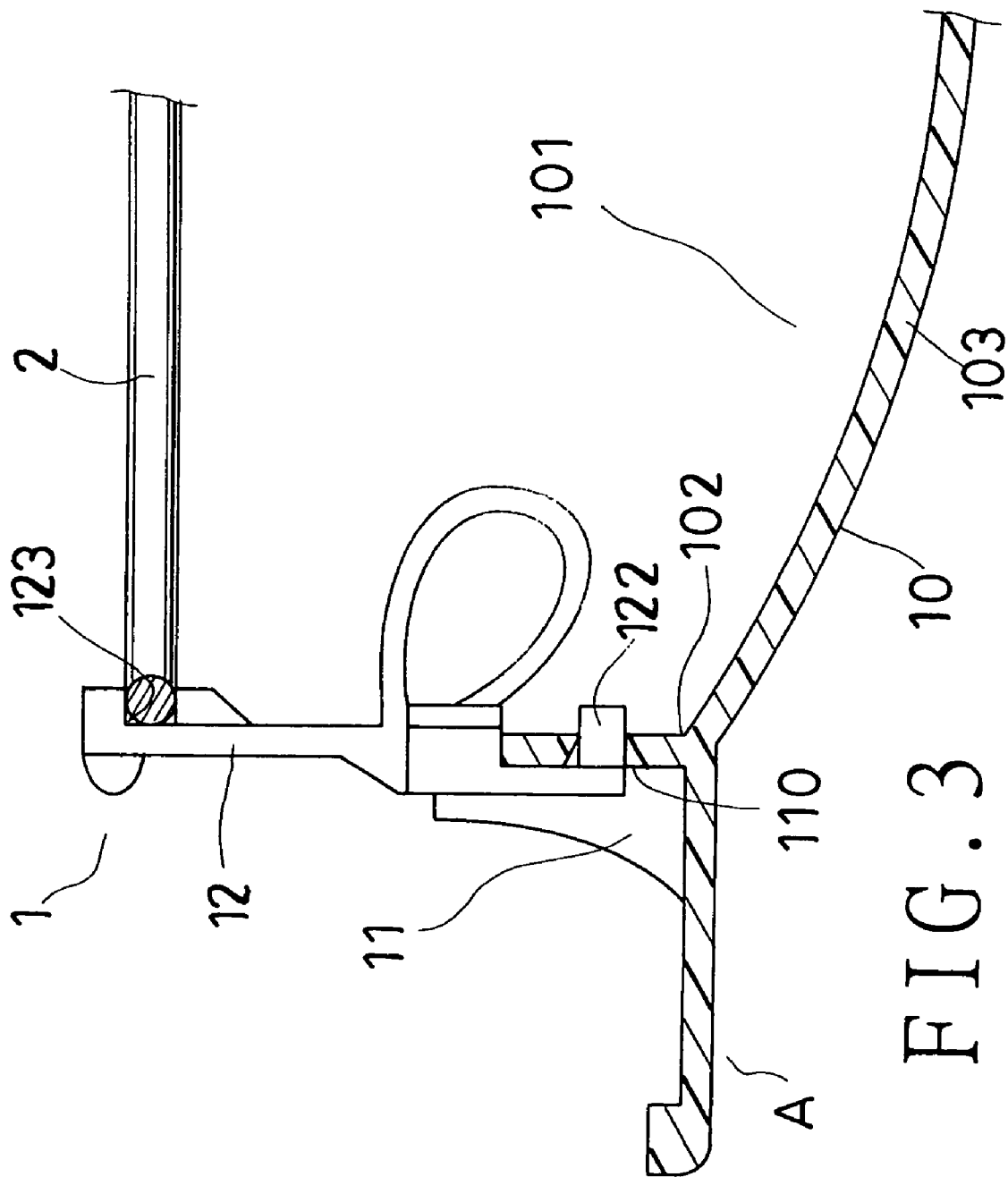
FIG. 3 is a partial sectional view of the present invention being assembled.

In assembly, first the fastening pieces 12 are separated from the peripheries 103 of the hollow portions 101 of the wheel cover (A) from the connecting portions 121 thereof, and next the fastening pieces 12 are joined to the holding base members 11 respectively with the fitting portions 122 being fitted to the detainment portions 110 so as to put the composite fastening components 1 together. Next, the wheel cover (A) is joined to an iron ring 2 with the iron ring 2 being fixedly held in the recessed holding portions 123 of the fastening pieces 12, as shown in FIG. 3. Thus, the wheel cover (A) can be securely joined to a wheel by means of the fastening pieces 12 of the composite fastening components 1.

Figure 2:
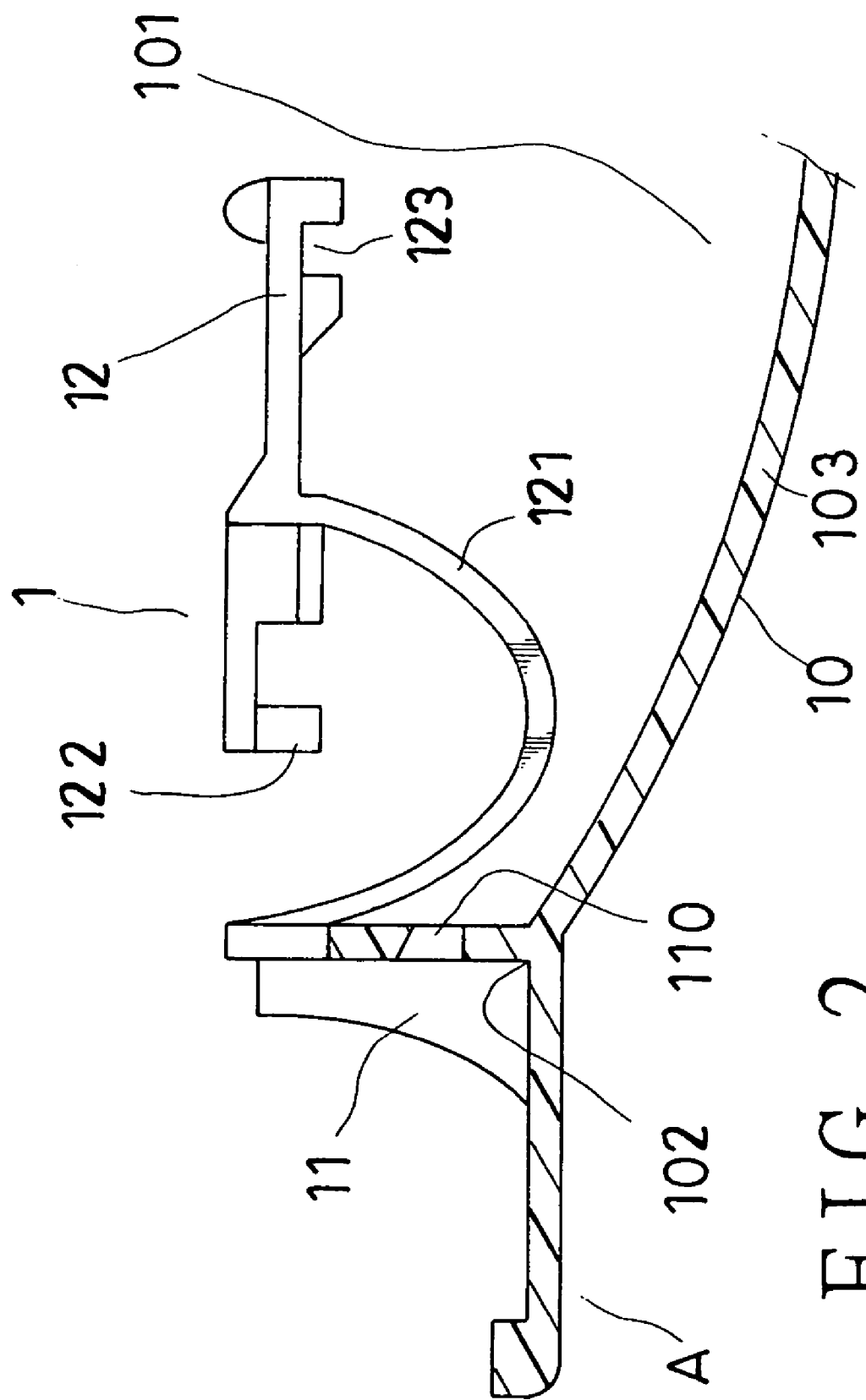
FIG. 2 is a partial sectional view of the present invention.

Referring to FIGS. 2 and 3, the holding base members 11 are on the inner annular portion 102 of the raised ornamental body 10 of the wheel cover (A), and adjacent to the hollow portions 101 of the raised ornamental body 10 respectively; if the fastening pieces 12 are formed in such a position as to adjoin the corresponding holding base members 11, they can be directly joined to the holding base members 11 to constitute the composite fastening components 1, not having to be first removed from the wheel cover body 10; if the fastening pieces 12 don't adjoin the corresponding holding base members 11, they have to be separated from the wheel cover body 10 first in assembly.

Figure 4:
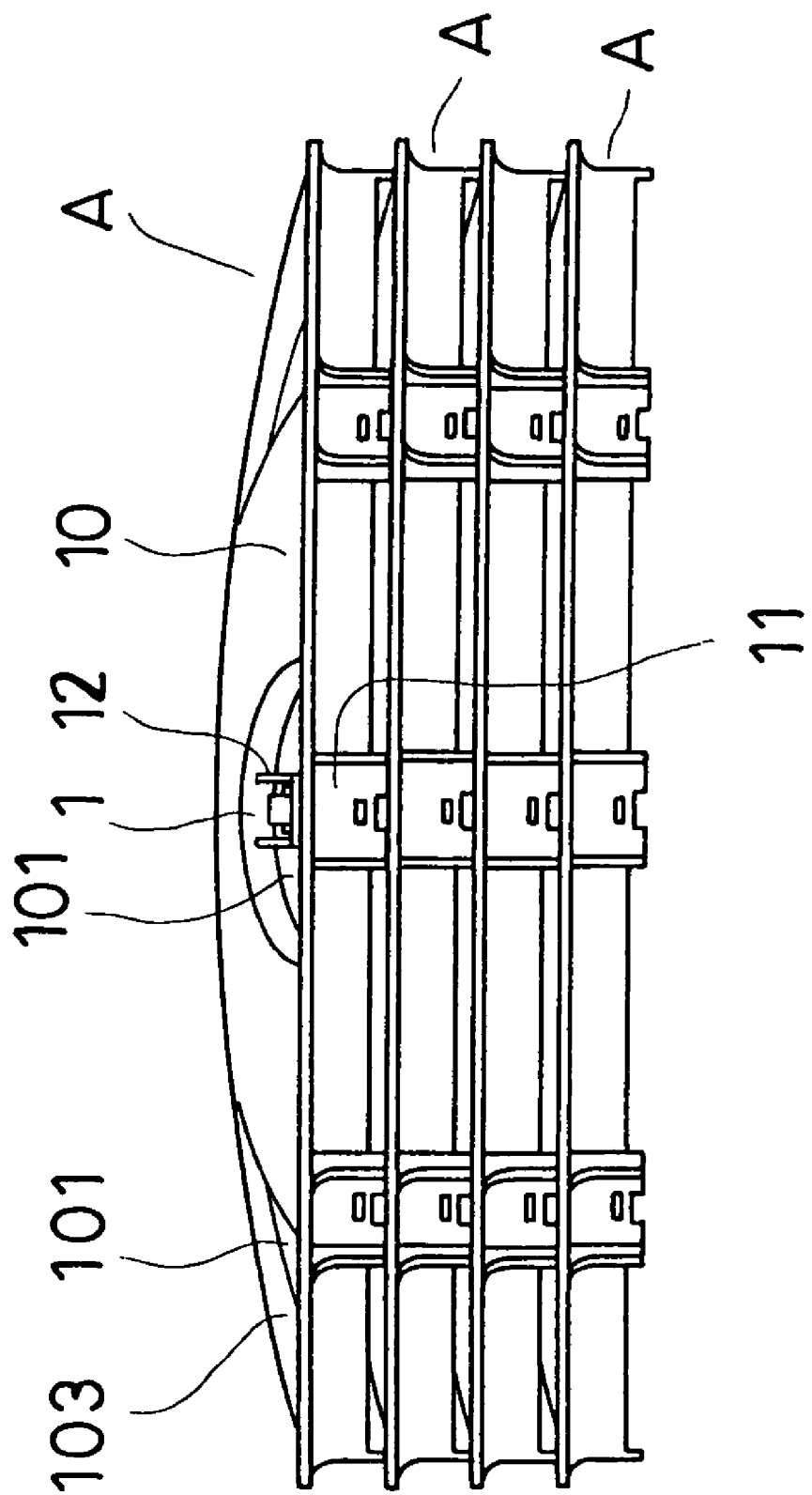
FIG. 4 is a side view of several wheel covers of the present invention, which are stacked up.

Referring to FIG. 4, before the fastening pieces 12 are separated from the body 10 of the wheel cover (A) and joined to the corresponding holding base members 11, they are contained in the hollow portions 101 of the body 10. Therefore, when several wheel covers (A) of the present invention are stacked up, the fastening pieces 12 won't cause increase to the volume of the pile of wheel covers (A), and in turn the pile of wheel covers (A) occupy relatively little space, and will cost less expense to store and transport.

Figure 5:
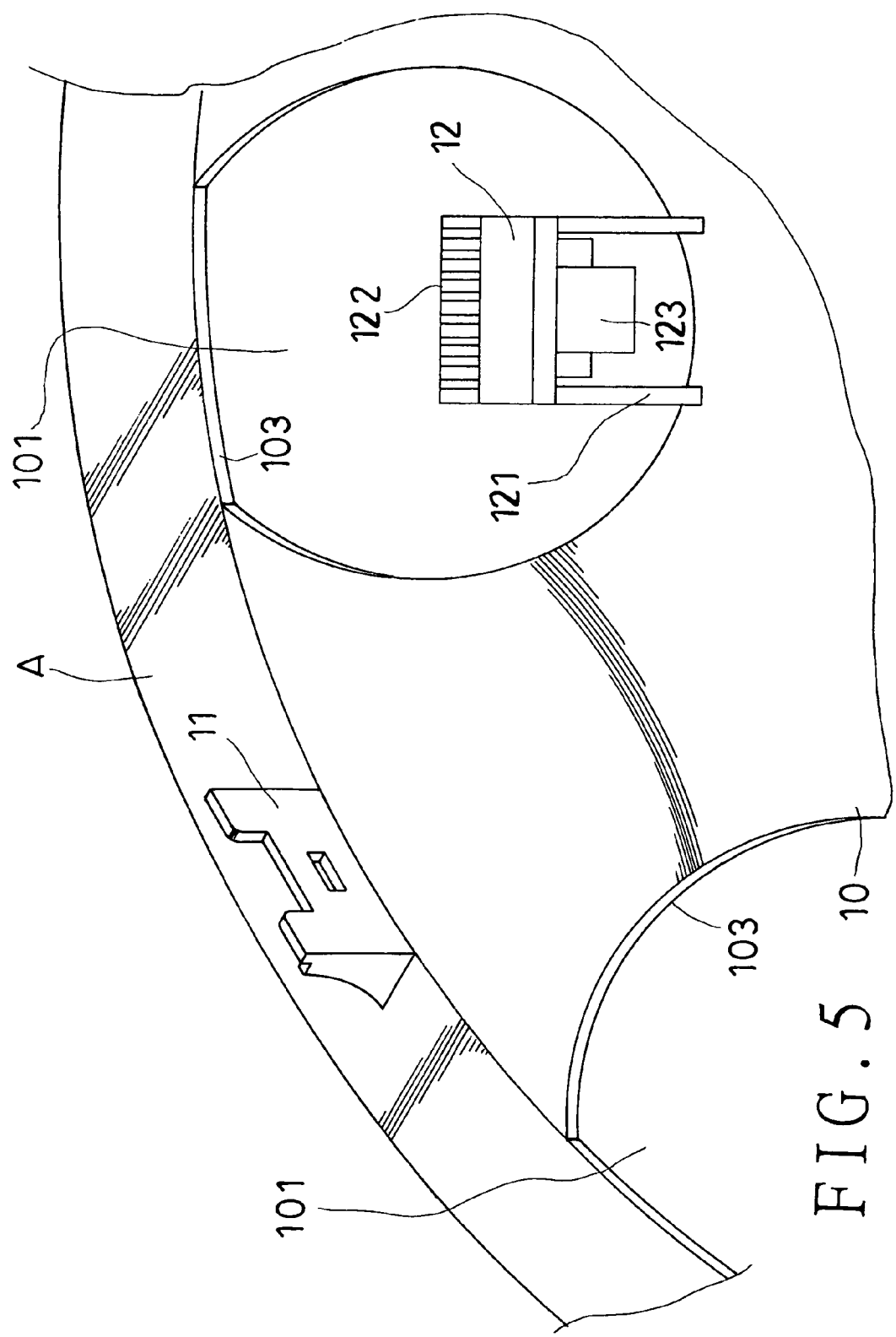
FIG. 5 is a partial perspective view of a second embodiment of the present invention.
Figure 6:
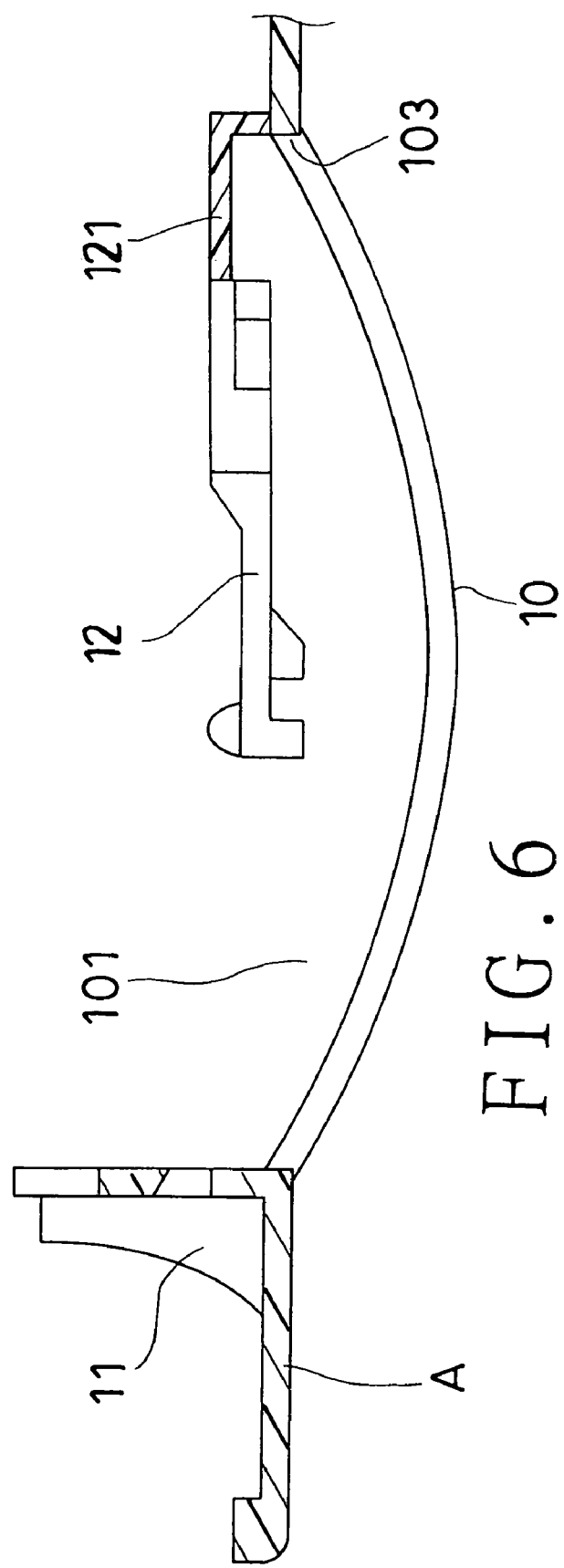
FIG. 6 is a partial sectional view of the second embodiment.
Figure 7:
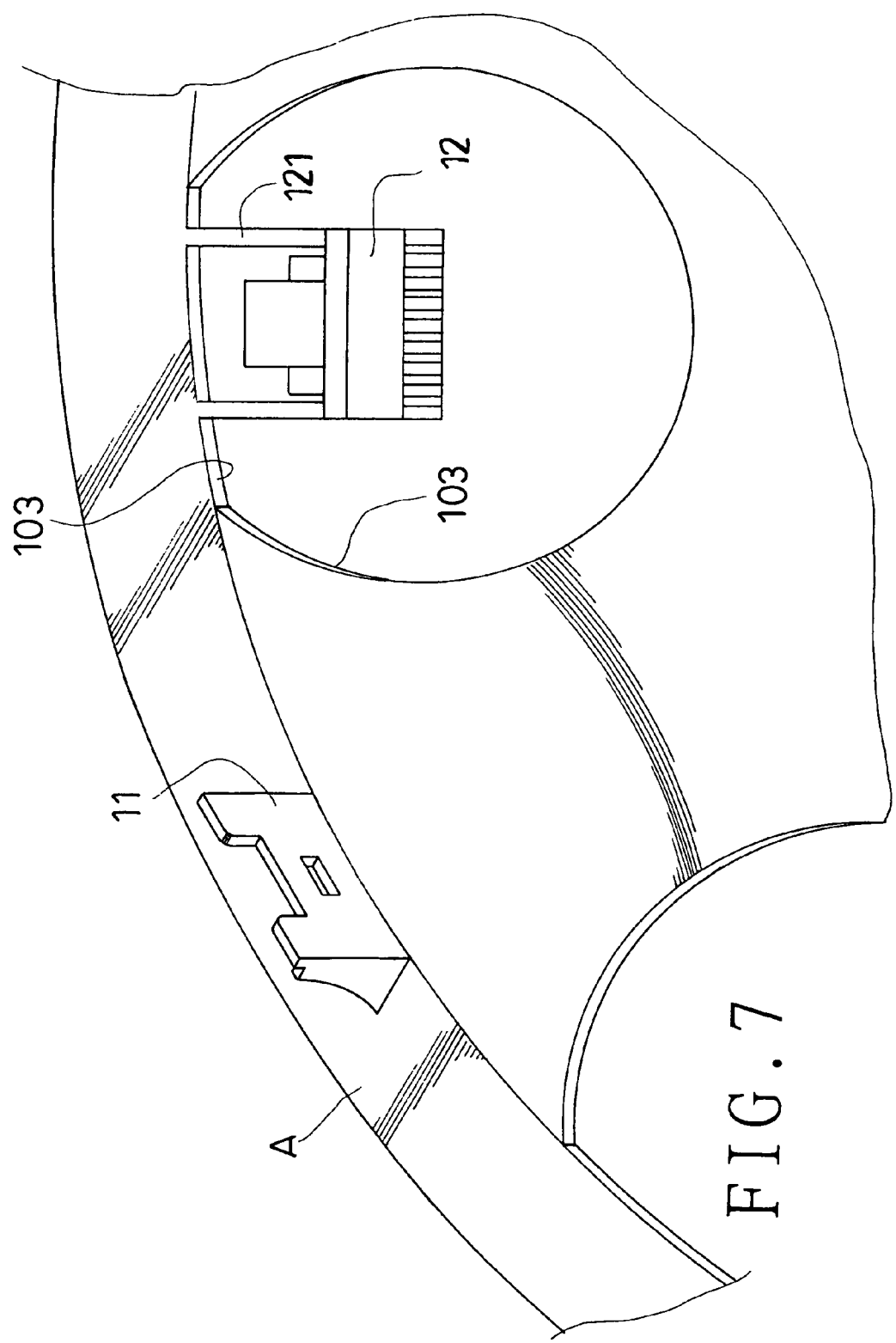
FIG. 7 is a partial perspective view of a third embodiment.
Figure 8:
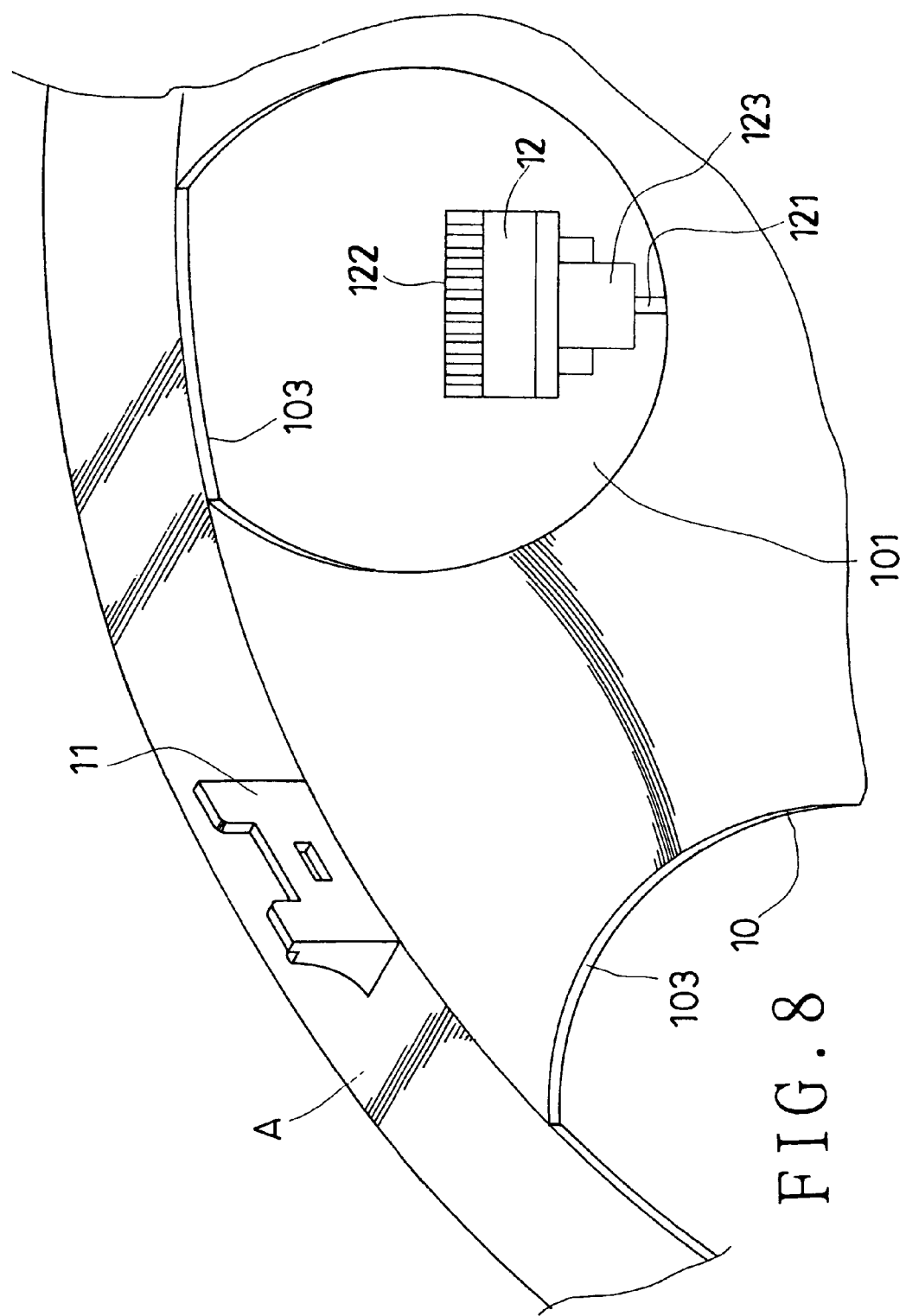
FIG. 8 is a partial perspective view of a fourth embodiment.
Figure 9:
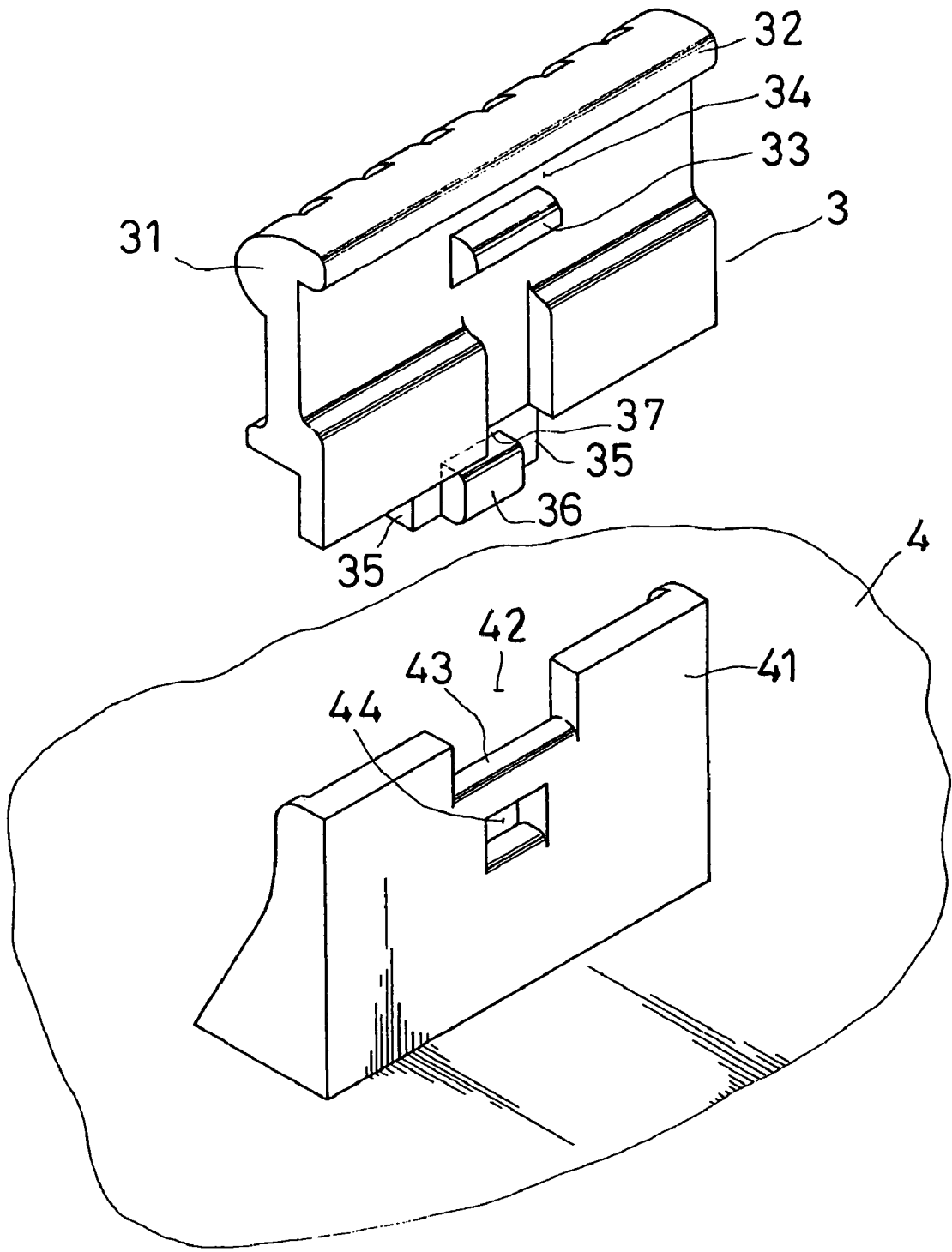
FIG. 9 is a perspective view of the conventional wheel cover.

The fastening pieces 12 can be originally connected to root portions of the corresponding holding base members 11 at the connecting portions 121 in manufacturing; in this case, the fastening pieces 12 don't have to be first removed from the wheel cover body 10 to be joined to the holding base members 11. Or alternatively, referring to FIG. 5 to FIG. 8, the fastening pieces 12 can be originally a distance from the holding base members 11 on the peripheries 103 of the hollow portions 101 of the wheel cover body 10. Furthermore, the connecting portions 121 can be on two sides of the fastening pieces 12; in this case, each fastening piece 12 has two connecting portions 121, as shown in FIGS. 5 and 7. Or alternatively, the connecting portions 121 are formed on a middle portion of the fastening pieces 12, as shown in FIG. 8. The joints between the wheel cover body 10 and the connecting portions 121 of the fastening pieces 12 are preferably on the inner side of the wheel cover body 10; thus, the joints won't show to spoil the appearance of the wheel cover (A) after the fastening pieces 12 are removed and joined to the holding base members 11 to comprises the composite fastening components 1.

From the above description, it can be seen that the present invention has the following advantages:

1. The fastening pieces of the composite fastening components are formed together with the raised ornamental body of the wheel cover in the same mold. Therefore, only one mold is used to manufacture the wheel cover of the present invention, and in turn the manufacturing cost is relatively low.

2. The fastening pieces of the fastening components are joined to the wheel cover body, and received in the hollow portions before assembly. Therefore, when several such wheel covers are stacked up, the fastening pieces won't cause increase to the volume of the pile of wheel covers, and in turn the pile of wheel covers will occupy relatively little space to be easy to store and transport.

3. The fastening pieces of the composite fastening components are formed together with the raised ornamental body of the wheel cover. Therefore, there will certainly be enough fastening pieces to be joined to the holding base members to constitute the fastening components. And, there won't be risk of the fastening pieces being omitted in packaging/getting lost in shipment.

4. The joints between the wheel cover body and the connecting portions of the fastening pieces are on the inner side of the wheel cover body. Therefore, the joints won't show to spoil the appearance of the wheel cover after the fastening pieces are removed from the wheel cover body and joined to the holding base members.

What is claimed is:

1. Fastening structure of a wheel cover, comprising
 a one piece wheel cover, which has a raised main body, the raised main body having an annular portion on an inner side thereof; the raised main body having a plurality of hollow portions thereon;
 a plurality of fastening components spaced apart on the peripheral portion of the inner side of the raised main body; each of the fastening components including:
 a holding base member adjoining the annular portion of the inner side of the raised main body; and
 a fastening piece; the fastening piece being formed on one of inner sides of peripheries of the hollow portions of the raised main body of the wheel cover; the fastening piece having connecting portions extending from the fastening piece to the raised main body; the fastening piece being capable of being removed from the raised main body to be joined to the holding base member to constitute the fastening component.

2. The fastening structure of a wheel cover as claimed in claim 1, wherein each of the holding base members has a detainment portion, and each of the fastening pieces has a fitting portion to be connected to a corresponding said detainment portion.

3. The fastening structure of a wheel cover as claimed in claim 1, wherein the holding base members of the fastening components are formed in such a position as to be adjacent to one of the hollow portions of the raised main body of the wheel cover.

4. The fastening structure of a wheel cover as claimed in claim 1, wherein the holding base members are formed on the inner annular portion of the raised main body in such a position as to be apart from the hollow portions of the raised main body.

5. The fastening structure of a wheel cover as claimed in claim 1, wherein the connecting portions of each of the fastening pieces stick out from two sides of said fastening piece.

6. The fastening structure of a wheel cover as claimed in claim 1, wherein the connecting portions of each of the fastening pieces stick out from a middle portion of said fastening piece.

* * * * *